May 17, 1938.　　　　L. B. BACON　　　　2,117,933
LIQUID LEVEL GAUGE
Filed Aug. 15, 1936　　　4 Sheets-Sheet 1

Inventor:
Leonard Bernard Bacon
Per
Hubert E Vick
Atty.

May 17, 1938.     L. B. BACON     2,117,933
LIQUID LEVEL GAUGE
Filed Aug. 15, 1936     4 Sheets-Sheet 2
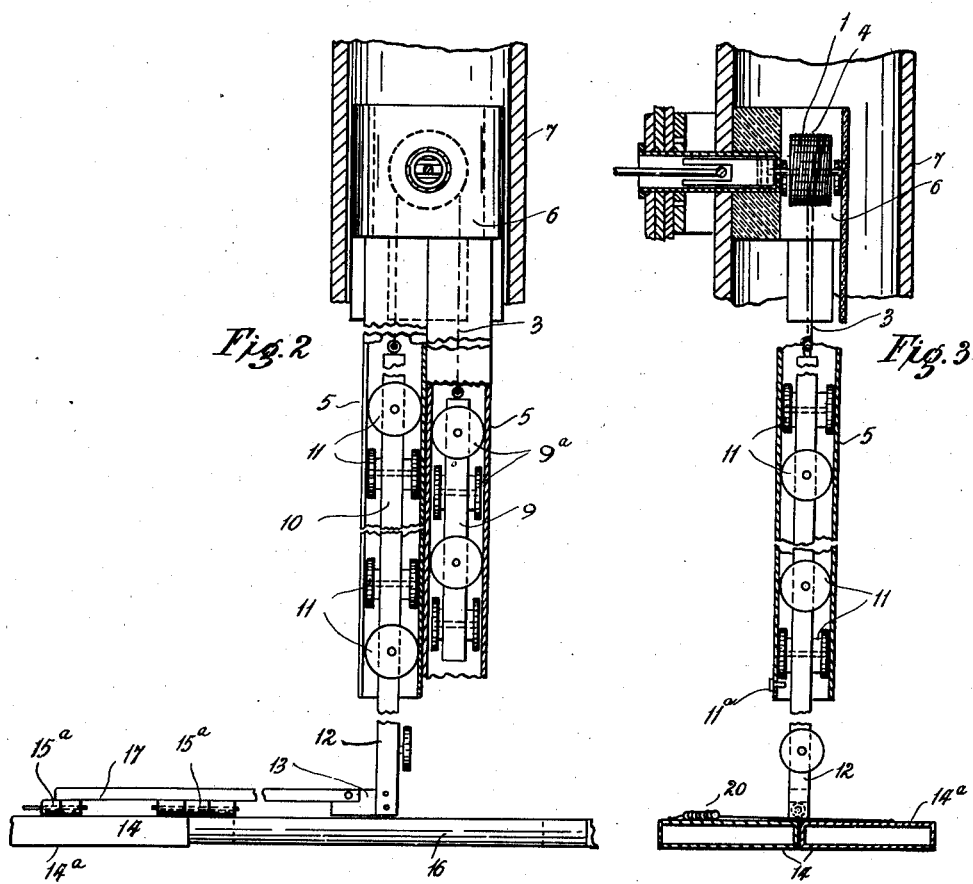

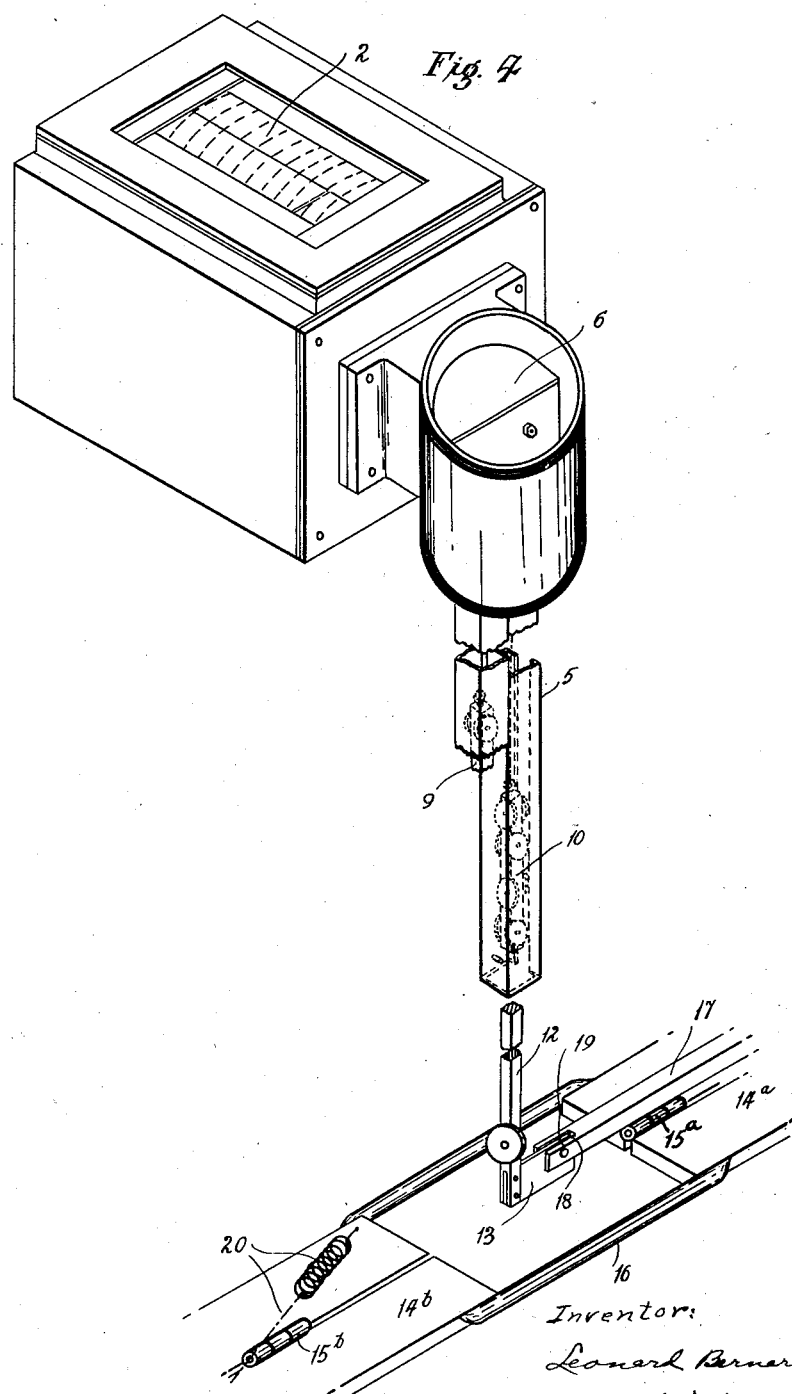

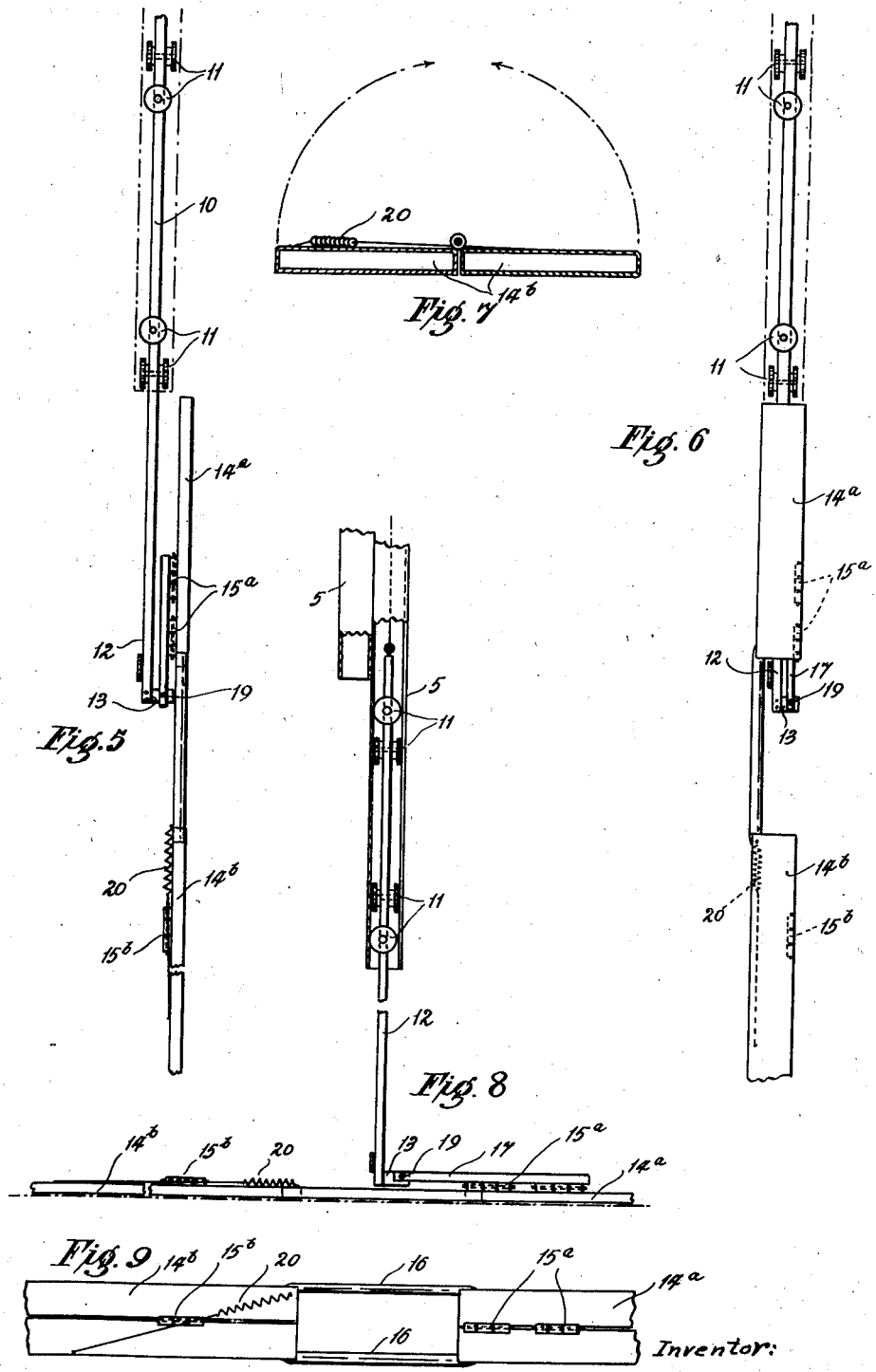

Patented May 17, 1938

2,117,933

UNITED STATES PATENT OFFICE 2,117,933

LIQUID LEVEL GAUGE

Leonard Bernard Bacon, East Brunswick, Victoria, Australia

Application August 15, 1936, Serial No. 96,298
In Australia August 26, 1935

9 Claims. (Cl. 73—311)

The invention relates to an improved liquid level gauge and has for an object the facilitation of entry and egress of a float into and from a container of the nature of a petrol tank. Another object of the invention is to provide more accurate recordings on an indicating device. Yet another object is to provide a simple and inexpensive yet accurate float mechanism capable of faithfully following the level of the liquid to be measured.

Yet another object of the invention is to limit inaccuracy due to friction.

In the accompanying drawings

Fig. 2 is an elevation in section and having parts broken of the float mechanism including an illustration of the mechanism which actuates indicating means.

Fig. 3 is an illustration in section of the same parts as in Fig. 2 but from a different direction.

Fig. 4 is a perspective view (with parts broken) of the mechanism whereby the float actuates the rotary member which actuates the indicating means shown in its housing.

Fig. 5 is an elevation showing the float rotated to a vertical position but unfolded.

Fig. 6 is an elevation of the float vertical and folded.

Fig. 7 is an end elevation in section of the members of one wing of the float.

Fig. 8 is an elevation in part section of the float depending from the trolley in its housing.

Fig. 9 is a plan of the central portion of the float.

Figure 1:
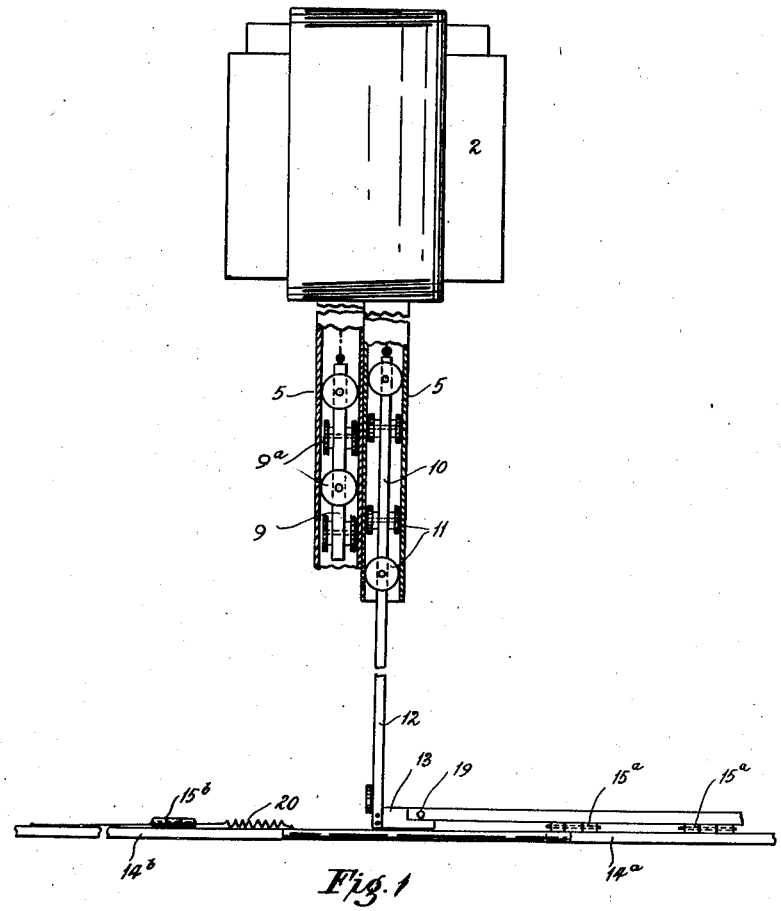
Fig. 1 is an elevation in part section showing the float and trolley from which it depends.

Referring to the embodiment of my invention disclosed by the accompanying drawings, as an example, I show a suitable rotary member, such as pulley 1, that is adapted to actuate any suitable indicating means, such as 2. This indicating means, for example, may be substantially the device described in my copending U. S. patent application Serial No. 96,297, filed August 15, 1936. Where a rotary pulley 1 is employed as the actuating member, the circumference of such pulley may provide one or more spiral threads 4 operatively receiving one or more turns of a pulley rotating or actuating flexible connection such as wire 3 by which the pulley can be rotated in either direction. The ends of the wire 3 depend vertically on opposite sides of the pulley, and extend downwardly in separate vertical tubular housings or guideways 5, 5. These longitudinally elongated tubular members or housings are preferably carried by and depend from the case or housing 6 in which the pulley 1 is located. This housing or box 6 is located within the dip tube 7, of any suitable tank into which a float, for instance, such as hereinafter described, is adapted to be located. The housing 6 is normally fixedly located within the dip tube.

One end of the wire 3 is secured to and carries a counter-weight 9, vertically movable in one of the tubular guides 5. This counterweight 9 is preferably provided with rotary guide wheels 9a mounted on axes carried by the weight and arranged at various angles around the longitudinal axis of the weight to travel on the inner surfaces of the guide 5 for the purpose of centering the weight within the guide and reducing friction.

The other end of the wire 3 that depends vertically in the other vertical tubular guideway 5, is fixed to the upper end of a vertical longitudinally elongated trolley 10, vertically movable longitudinally in the last mentioned tubular guide and provided with transverse axes projecting in various lateral directions and carrying rotary guide wheels 11 contacting and traveling on the inner surface of the tubular guide for centering the trolley body 10 and for reducing friction. The guiding wheels 11 carried by the trolley 10, serve the additional purpose of maintaining the trolley against axial movement, that is against movement around its longitudinal vertical axis.

The longitudinally elongated vertical tubular guide 5, in which the trolley 10 travels vertically, is provided at its lower portion, preferably, with a removable internal stop 11a, for limiting the downward movement of the trolley within the tubular guide.

The longitudinal body 10 of this trolley is provided with a vertical depending longitudinal-extension 12, normally projecting downward a substantial distance beyond the lower end of the tubular member 5, to form a push and pull vertical bar for coupling to the float mechanism 14, and for carrying the same when elevated above the liquid in the tank. The lower end of this push and pull preferably normally stiff extension 12, is provided with a horizontal or laterally-projecting short foot or stem 13 rigid with the extension 12. The tubular guide 5 in which the trolley 10 is located, is provided with a longitudinal slot or opening (see Figs. 2 and 4) in the vertical plane in which the foot 13 is located, for the travel of the foot 13 when rising and falling in a horizontal plane above the lower end of the tubular guide 5.

This foot 13 constitutes the means through which the float mechanism 14 is operatively coupled to the trolley body extension 12.

In the example illustrated, the float mechanism consists of a number of float units, such as hollow water-tight, light-metal, float units 14a, 14a, and 14b, 14b. These can be arranged to form two wings, one composed of the several units 14a arranged side by side and the other composed of the units 14b arranged side by side in longitudinal alinement with the units 14a and longitudinally spaced therefrom and thus held by the bridge bars 16, 16, one rigid with each of one pair of longitudinally alined units 14a, 14b, and the other rigid with the other units 14a, 14b. The units 14a, 14a, are pivotally joined together at their adjoining longitudinal edges by a hinge connection 15a having a preferably elevated longitudinal axis, preferably alined with the longitudinal axis of the float wing formed by said two units. The units 14b are correspondingly pivotally united by a longitudinal hinge 15b, the axis of which is alined with the axis of the hinge 15a. These alined hinges 15a, 15b, are designed and arranged to permit the float units 14a, and 15a to swing upwardly or toward and from each other and thus permit the float mechanism wings to fold upwardly toward each other or downwardly away from each other on the common axis 15a, 15b.

The float mechanism as a unit, is hung from and coupled to the foot 13 through the medium of an arm 17 secured to and arranged longitudinally of and above the float mechanism and at its inner end pivotally joined to the foot 13 to swing on the transverse axis 19. Merely as an example, I show the inner end 18 of the arm 17 bifurcated and straddling the end of the foot 13 and held loosely thereto by transverse pivot 19 on which the arm 17, with the float mechanism, is freely swingable vertically to and from the float horizontal position and the float vertical position. The transverse pivotal axis 19 between the float mechanism and the trolley extension 12, is preferably arranged to one side of the center of gravity of the float mechanism, in such manner that the weight of the float mechanism wing 14b will exceed the weight of the float mechanism wing 14a, and thus cause the weight of the wing end 14b to elevate the wing end 14a when the trolley extension 12 elevates the float mechanism above the level of the liquid in the tank. Thus when the float mechanism is above and clear of the liquid in the tank, such mechanism will assume the vertical position, for instance, as disclosed by Figs. 5 and 6 of the drawings.

The arm 17, in the example shown is formed by a stiff narrow bar 17 arranged longitudinally of and above the float mechanism wing 14a and parallel with the longitudinal axis of the hinge 15a, and the inner end of this arm 17 projects inwardly above the open space between wings 14a, 14b. This arm 17 is secured to the hinges 15a, in such manner as not to interfere with the swinging movement of the float units 14a on the hinge axis 15a.

A retractive coil spring 20 is arranged at an angle to the longitudinal axis of the float units 14b, 14b, and is secured at one end to the outer longitudinal edge portion of one of said float units and at the other end to the longitudinal edge portion of the other unit 14b at a remote point longitudinally of the units from the first named securing point, and is arranged above the plane of said units when in operative horizontal position, (Figs. 4 and 7) and then under tension in such manner as to cause the two sets of connected units 14a—14b to fold toward each other when the float mechanism is raised from the liquid level.

In the example shown, the central longitudinal normally-horizontal arm 17, by which the float mechanism, as a unit, is operatively coupled to and sustained from the vertical extension or bar 12, is in the same vertical plane as said bar 12. Thus, when the float mechanism as a unit is elevated from the liquid, said mechanism swings vertically on transverse axis 19, to a vertical position parallel with bar 12, and with the arm 17, beside and also parallel with bar 12. Thus, the float units 14a, of the then uppermost wing of the float mechanism will then be folded toward each other on opposite sides of the arm 17, and bar 12, with the float mechanism in completely transversely collapsed condition for upward removal.

It will also be noted, that in this example, the float units 14a, 14b, on the one hand and 14a, 14b, on the other hand, fold toward each other on a longitudinal axis at their inner longitudinal edges with their free or outer longitudinal edges moving upwardly and inwardly, to move the units 14a, 14a, inwardly toward opposite sides of bar 12, and arm 17, to thereby approximately enclose the same.

In operation, to insert the device in a tank, the wings of the float mechanism are folded, Figs. 5, 6, and it naturally hangs vertically because it is pivoted off centre and consequently one wing is heavier than the other. In these circumstances the members of the wing 14a fold about the supporting bar 12 extending from the end of the housing 5 and the float mechanism forms a narrow unit in the same plane as the housing 5 and is thus capable of being passed through a small orifice such as that of a dip tube of a petrol tank. The housing 6 is fixed in position and the float mechanism is allowed to descend against the pull of the counter weight 9 when the end of the wing 14b touches the liquid the pressure of the liquid causes the float mechanism to turn as a unit about its pivot 19, and the float units of each of the wings swing or open outwardly and downwardly as the spring 20 is very light and has little effect against the forces tending to open out the said units. Thus the float mechanism is brought to lay flat on the liquid to be measured.

To extract the device, the housing 6 is unfixed and the operator commences to pull upwardly—the supporting bar 12 carries the float mechanism with it but as the latter is mounted off centre it turns on its pivot 19, in a vertical plane until the wing 14a touches the bar 12—now as the arm 17 is centrally disposed between the members of the wing 14a, the said wing will receive a slight knock centrally of the said members and thus they will tend to fold inwardly towards each other this tendency being accentuated by the spring 20. Thus the float mechanism is folded and capable of being withdrawn through the dip tube or other small orifice.

I claim:—

1. In combination, an indicator actuating rotary member; and means for rotating said member in either direction according to the rise and fall of liquid in a tank, said means including float mechanism and an operative connection therefrom to said rotary member, said connection including a wire depending from and operatively coupled to said rotary member, a vertical push and pull bar depending from said wire, said bar at its lower end provided with a rigid lateral foot, said float mechanism including sets of float units pivotally united to swing toward each other and to form longitudinally arranged opposite wings, one of said wings being provided with an arm joined to said foot by a transverse pivotal axis on which the float mechanism as a unit is swingable vertically.

2. In combination, a support; vertical guides depending therefrom; an indicator actuating rotary member; a flexible connection wound thereon with its ends depending in said guides, respectively; a counterweight in one of said guides secured to and depending from one end of said wire; a vertically movable wheeled trolley in the other guide and secured to and depending from the other end of said wire, said trolley having its longitudinal body provided with a depending push and pull longitudinally elongated extension, and collapsible float mechanism pivotally joined to the lower end of said extension to swing vertically with respect thereto on a transverse off-center axis.

3. In combination, a support; a vertical tubular guide depending therefrom and carried thereby; an indicator-actuating rotary member arranged above said guide; a flexible connection operatively associated with said member to rotate the same and depending in said guide; a wheeled trolley secured to and depending from said connection and confined and centered in said guide for free vertical movement therein and against axial movement, the body of said trolley being provided with a longitudinally elongated depending longitudinal push and pull extension; and collapsible float mechanism joined as a unit to said extension by an off-center transverse pivotal connection on which the unit is vertically swingable with respect to the extension.

4. In combination, a support; a vertical guide fixed thereto and depending therefrom; an indicator actuating rotary member; a member-rotating flexible connection depending therefrom; a longitudinally elongated wheeled trolley freely vertically movable and centered in said guide and secured to and depending from said connection; a stop to limit the descent of the trolley from said guide, said trolley provided with a longitudinal vertical downward push and pull extension; and a collapsible float mechanism pivotally joined to the lower end of said extension to swing vertically relatively thereto.

5. In combination, a support; a longitudinally elongated guide fixed to and depending from said support; an indicator actuating rotary member arranged above said guide; a member rotating connection extending therefrom vertically into said guide and provided therein with a vertically movable trolley having a longitudinally elongated push and pull extension depending below the guide and provided with a lateral foot rigid therewith; and float mechanism having off-center transverse pivotal connection with said foot, said float mechanism as a unit being relatively swingable vertically on said transverse connection, said guide having a longitudinal side opening to receive said foot.

6. In combination, an indicator actuating rotary member; a relatively fixed depending guideway; float mechanism; and an operative rotary member-actuating connection between said float mechanism and said rotary member including a trolley vertically movable in said guide and provided with a longitudinally elongated extension depending beyond said guide, said float mechanism including longitudinally alined and spaced wings, each wing comprising float units arranged side by side and pivotally united to swing upwardly toward each other from a common horizontal plane, the pivotal axes on which said units of the wings are swingable being alined and arranged along the longitudinal axis of the float mechanism, said float mechanism provided with a relatively fixed arm arranged in the plane of said axis and pivotally joined to said extension whereby the float mechanism as a unit can swing vertically with respect to said extension, said arm being arranged in substantially the same vertical plane as said extension.

7. In combination, indicator operating means; float mechanism; and an operative connection between said float mechanism and said means, including a depending vertically movable bar having a rigid lateral projecting foot, said float mechanism including normally-horizontal longitudinally-alined wings, each wing including a pair of normally horizontal float units swingable toward and from each other, on an elevated intermediate axis, the axes of the two wings being alined and corresponding units of the two wings being joined, spring means tending to swing the units of said wings toward each other, and a float mechanism-supporting arm arranged in the vertical plane of said extension and said axes, said arm being united to said foot by transverse pivotal axis rendering the float mechanism as a unit swingable vertically with respect to the extension.

8. In a liquid level gauge; a longitudinally-movable operative connection having a vertical portion, in combination with float mechanism operatively coupled as a unit to said vertical portion of the connection by a transverse pivotal axis offset from the center of gravity of said mechanism, whereby when elevated from horizontal liquid-contacting position, said mechanism will swing on said axis to vertical position approximately parallel with said portion, said mechanism including opposite longitudinally arranged wings, each embodying longitudinally arranged float units pivotally united to swing from horizontal position upwardly and toward each other on a longitudinal axis, the units of the uppermost wing when elevated adapted to fold toward opposite sides of said vertical portion.

9. In a liquid level gauge; a longitudinally-movable operative connection having a vertical portion, in combination with float mechanism operatively coupled as a unit to said vertical portion of the connection by a transverse pivotal axis offset from the center of gravity of said mechanism, whereby when elevated from horizontal liquid-contacting position, said mechanism will swing on said axis to vertical position approximately parallel with said portion, said mechanism including opposite longitudinally arranged wings, each embodying longitudinally arranged float units pivotally united to swing from horizontal position upwardly and toward each other on a longitudinal axis, the units of the uppermost wing when elevated adapted to fold toward opposite sides of said vertical portion; and spring means yieldingly acting on said longitudinally arranged float units to swing them upwardly and toward each other.

LEONARD BERNARD BACON.